US007109869B2

(12) United States Patent
Sweatte

(10) Patent No.: US 7,109,869 B2
(45) Date of Patent: Sep. 19, 2006

(54) METHOD AND SYSTEM FOR FACILITY SECURITY

(76) Inventor: Clifford Sweatte, 19914 Ebenezer Church Rd., Bluemont, VA (US) 20135

( * ) Notice: Subject to any disclaimer, the term of this patent is extended or adjusted under 35 U.S.C. 154(b) by 275 days.

(21) Appl. No.: 10/751,552

(22) Filed: Jan. 5, 2004

(65) Prior Publication Data
US 2005/0146417 A1    Jul. 7, 2005

Related U.S. Application Data

(63) Continuation-in-part of application No. 10/023,421, filed on Dec. 17, 2001, now Pat. No. 6,674,367, which is a continuation-in-part of application No. 09/669,417, filed on Sep. 25, 2000, now Pat. No. 6,335,688.

(60) Provisional application No. 60/156,447, filed on Sep. 28, 1999.

(51) Int. Cl.
*G08B 23/00*     (2006.01)

(52) U.S. Cl. ............... 340/573.1; 340/539; 340/506

(58) Field of Classification Search ........... 340/539.13, 340/573.1, 506, 573.4, 10.42, 10.6; 455/88, 455/100; 235/384
See application file for complete search history.

(56) References Cited

U.S. PATENT DOCUMENTS

| 5,682,142 | A | * | 10/1997 | Loosmore et al. | ....... 340/572.1 |
| 5,914,671 | A | | 6/1999 | Tuttle | .............. 340/825.51 |
| 5,982,281 | A | | 11/1999 | Layson | ................ 340/539 |
| 6,085,976 | A | | 7/2000 | Sehr | ...................... 235/384 |
| 6,127,917 | A | | 10/2000 | Tuttle | ................... 340/10.1 |
| 6,229,445 | B1 | | 5/2001 | Wack | ................. 340/572.1 |
| 6,246,320 | B1 | | 6/2001 | Monroe | ................ 340/506 |
| 6,335,688 | B1 | | 1/2002 | Sweatte | .............. 340/573.1 |
| 6,338,041 | B1 | * | 1/2002 | Kawamata | ................ 705/5 |
| 6,674,367 | B1 | | 1/2004 | Sweatte | .............. 340/573.1 |

* cited by examiner

*Primary Examiner*—John Tweel, Jr.
(74) *Attorney, Agent, or Firm*—Clifford Kraft

(57) ABSTRACT

A method and system for airport or any other building security where passengers or persons entering a building are caused to undergo a positive identification (ID) check by fingerprint scan, retinal or iris scan, face feature scan, or by any other means of positive identification. A photograph can be taken also. This data, plus the positive ID, and any other optional data about the person, can be checked against government or law enforcement data bases for any government or law enforcement interest in the person. The person can be given an electronic card that can have wireless capability where the person can be tracked while inside the building, airport, or the airspace system. The system can be notified when the person enters any area, secure area, or when a person boards a means for transportation like an aircraft. The system can allow law enforcement to apprehend a person with law enforcement interest at a time and place convenient to law enforcement.

20 Claims, 5 Drawing Sheets

METHOD AND SYSTEM FOR FACILITY SECURITY

This is a continuation-in-part of application Ser. No. 10/023,421 filed Dec. 17, 2001, now U.S. Pat. No. 6,674,367, hereby incorporated by reference, which was a continuation-in-part of application Ser. No. 09/669,417 filed Sep. 25, 2000, now U.S. Pat. No. 6,335,688, hereby incorporated by reference; this application also claims priority from U.S. provisional application 60/156,447 filed Sep. 28, 1999, hereby incorporated by reference.

BACKGROUND

1. Field of the Invention

This invention relates generally to airport security and in particular to a method and system for identifying and tracking a person, passenger, or employee in and through any building and in particular from and through airports and aircraft in the world air transportation system.

2. Description of Related Art

An identification badge is many times provided to employees of buildings or airports. Passengers in airports and visitors to buildings however are identified only by a single photo identification that is presented at check-in, or sometimes not at all in the case of buildings. Security consists of a series of questions concerning baggage and tickets. No check is made on the identity of the passenger except to ask for a government issued piece of ID like a driver's license or passport. There is no cross-checking as to whether the presented ID is valid or fraudulent. The passenger's location in the airport or building is not known or tracked. When the passenger checks into a flight, a boarding pass is presented and the passenger boards the aircraft. There is no verification that the same passenger who checked in is the one that boarded, and it is very easy for a boarded passenger to exit the aircraft after boarding without being noticed by anyone. Security at airports is minimal as to who a passenger is and where the passenger is in the airport.

Since Sep. 11, 2001, airport security has come under tighter scrutiny; however, there is still no way to positively identify a passenger or track a passenger's movements while they are in the airport or aircraft; no way to ascertain when they have passed through security or whether they have exited a secure area without boarding a plane; no way to prevent or detect someone passing through security more than once, and no way to be sure the person on the plane is the same person who passed through the security checkpoint and/or was issued a boarding pass. In the case of buildings, the situation is worse. In this case, once a visitor is admitted to the building, usually, but not always, by signing in, the visitor is usually free to wander anywhere on any floor. A skilled terrorist could easily gain access to a roof, basement, or mechanical room area without being detected. There is no verification whatsoever that the person who checked in is who he claimed to be or that he or she went where they said they were going.

Prior art airport systems have proposed electronic tickets and smartcards that can be carried by passengers. Tuttle in U.S. Pat. No. 5,914,671 presents a system for locating an individual in a facility where a portable wireless transponder device is carried by the individual. Tuttle's device resembles a standard security badge with a possible photo of the individual on the badge. Tuttle's invention is directed toward location of employees who would wear such badges. Tuttle states that a passenger could also possess such an identification and be located. However, Tuttle's patent was developed with the idea that a business traveler would not want to stand in line for a ticket, much less for an electronic interrogation, and mentions the use of curb-side baggage check-in. His method terminates once a passenger or bag enters an aircraft. He makes no reference to any type of security checking of the individual.

Yokozawa et al. in U.S. Pat. No. 5,740,369 present an information delivery system and portable information terminal where an individual possesses a smartcard type of wireless device and can be tracked by a wireless system. Yokozawa also describes a person passing through a check-in gate with the gate itself recognizing and communicating with the portable device by wireless means. While Yokozawa presents a wireless device carried by a passenger, there is no mention of the security aspects of the situation.

The prior art shows systems where passengers and/or employees carry wireless smartcards that communicate in data bases, but not via satellite or internet, and none of these systems solve, or even address, the tremendous security problem that exists at airports and other buildings where potential passengers could be terrorists, criminals or other dangerous persons. They do not address the problem of whether a passenger actually boards a flight and remains on the plane, and whether the passenger actually arrives and exits a second or subsequent airport, nor do they propose be tracked while aboard an aircraft with data transmitted ahead to connecting aircraft and/or customs/law enforcement/immigration officials. In the current airport system and prior art systems, there has historically been no connection or relationship between airline database information and security database information. Since Sep. 11, 2001, in the US, there has been some recent sharing of FBI information with airlines; however, this has been limited to lists of known terrorists. There has been no direct access from the airport to the law enforcement data base.

What is badly needed is the ability to screen passengers or visitors and move then through a terminal to their aircraft and then on to their destination, or through a building to their destination while knowing at all times who and where the passengers are.

SUMMARY OF THE INVENTION

The present invention relates to a method and system for airport or building security where a passenger or visitor presents him/herself at the check-in counter or guard station in the normal way or simply enters a facility. The invention can be readily utilized in any mode of transportation: air, sea, rail or auto. Hereafter, the term "airport" or "aircraft" shall also refer to other transportation systems. This invention is designed to ensure interoperability across different modes of transportation overseen by various agencies.

A government generated picture identification can be presented (drivers license, passport, or government issued ID card, etc.). The present invention then requires additional positive identification by any reliable means including, but not limited to by fingerprint scan, retina or iris scan, face feature scan, voice scan, handprint, palmprint, finger length comparison, DNA, or any other means of positive identification. In addition, a new photo can be taken of the passenger during check-in. The total data thus acquired can be immediately compared against law enforcement databases such as FBI, Immigration, or INTERPOL, etc. to determine immediately if the potential passenger is wanted or known to be dangerous, and if the passenger is who he claims to be. There needs to be no indication at the check-in counter or guard station if a positive identification is made of a dangerous individual; rather, security personnel can be immediately notified. They can schedule any action to be taken to a convenient time and/or place.

The present invention requires check-in and a positive identification of a passenger. Fraudulent ID's where criminals or known "wanteds" or many known terrorists can be immediately identified by law enforcement. In the case of airports, the action of the present invention can continue past boarding and on through the flight and customs/immigration and can terminate upon exit at the passenger's final destination, or in the case of a building, when the person finally exits the building.

After the identification process is complete, the passenger can be checked into the flight, or a person can be allowed admission to the building, and then given a wireless device that may be in the form of a smartcard or any other portable device that can be carried or worn, including being worn on a wrist. This device serves as a boarding pass and airport/aircraft tracking device or as a tracking device in the building. The device can be a small, flat, card like a credit card, a device like a personal digital assistant, a device like a watch, or any other small electronic device that can contain electronics and wireless communication capabilities. Since the location of this card wireless device can be tracked in the airport or building by wireless antenna location means, by GPS, by assisted GPS or by direction fixing between multiple antennas, or any other tracking means, the location of the person can be known at all times while in any area of the airport, aircraft or building. In the case of a positive identification of a dangerous or wanted individual, law enforcement officials can apprehend the person if necessary anywhere in the airport or building that allows a safe and non-disruptive apprehension.

The present invention is also very useful for screening passengers entering or leaving a country such as the U.S. at a customs portal. People could present passports, be required to undergo a positive ID check with one of the methods described herein, and possible carry a smartcard device with them while they remain in the airport of within the airspace system. This could be applied either in the country of departure, the country of arrival or both. A more limited use of the smartcard could be used to keep track of people who have arrive on international flights and are waiting to pass through customs. In this more limited case, the person could be issued a smartcard while still on an aircraft and later turn it in when they successfully passed customs. The smartcard in that case would make sure they stayed in controlled areas.

In the case of an airport, the system can also report when the person has passed through carry-on security (normal X-ray, etc.), or any other security check point, when the person is in the departure gate area, and when the person has boarded an aircraft. At boarding, a second security check can optionally be made with a second fingerprint or retinal scan or any other positive identification method to verify that the person who checked in originally is the one boarding the flight. The system can positively make sure the person boards a certain aircraft and stays on since egress could be controlled by having to present the smartcard or device to exit, or a location detection could determine when a person has exited.

In the rare case of someone having to legitimately leave an aircraft after boarding, airline personnel could be immediately notified by the card at egress to ascertain why the exit is being made and to be able to assist the person (who might have gotten on the wrong plane, might be sick, etc.). An illegal or unexpected egress would be immediately noted by airport security personnel. It is also possible for the system to continue to communicate with the card inside the aircraft if the craft is also equipped with a local interior wireless system. This system could be optionally shut off during flight to avoid extra electromagnetic interference. It is also possible that satellite communication can possibly be carried on with the aircraft and hence the cards (or other ID devices) inside the aircraft while it is in flight or parked at a gate. Passenger's movements could be optionally tracked or mapped while they are onboard the aircraft in real time. Additionally, the movement information could be saved and reviewed at a later date if a particular passenger's movements during the flight would be of interest to law enforcement officials.

Upon arrival at a final or intermediate airport, a normal egress from the aircraft could be noted by the system in the new airport. The passenger's location could be tracked by the system through customs/immigration, if an international flight, on to baggage pickup and airport exit, or until re-boarding a subsequent flight. When the passenger finally exited the final airport, the card could be collected and recycled for reuse, and the system could note that the person had left the system.

A major improvement of the invention over the prior art is the positive identification of every passenger and possibly every person entering an airport or building as well as providing positive tracking at all times as to the location of the person in the airport, building, or in the world air transportation system consisting of all participating airports and aircraft. The invention provides a final determination that an individual has arrived at a final destination and departed the system or has legitimately left the building in question.

The present invention could be optionally applied to all people in airports or any other building, including visitors, by also requiring them to register on entry, at least by fingerprint scan, and also carry a card while in the airport or building. Anyone who tried to leave an airport or building without a card could be stopped and re-identified (sometimes people might lose the card or device). A lost card could be located through wireless communication with a central control point.

A more sophisticated version of a card or electronic device could be equipped with an LED display device where flight schedules could be called up, and an alarm that would buzz or otherwise indicate the approach of boarding time. The more sophisticated card could be connected into the internet for the convenience of the passenger so that the passenger could receive or send E-mail, get stock quotes, or generally surf the internet while waiting for the flight. A buzz or audible alarm could sound if there was an important announcement coming in for that passenger such as a gate change, etc. A more sophisticated version of the card could also contain a cellular telephone.

The present invention increases the speed by which a traveler or person entering a secure building or airport can proceed to their destination and increases safety and security. The present invention allows a screening agency to identify legitimate passengers and cargo as legitimate and detects criminals and other dangerous persons in order to prevent terrorist and other illegal acts.

The present invention has the ability to follow a single person and bag and back-track all of his or her movements. A keystroke could bring up all persons a target came into contact with as well as trace all of his contact's movements to see if they entered the airport together, then separated and came back together again after clearing security, etc. The tracking aspect of the present invention could allow law enforcement agents to stop a potential terrorist and all those he or she came in contact with prior to boarding. This tracking aspect could also record and store a person's movement throughout the building or airport complex. Patterns of suspected terrorists or criminals could be overlaid on each other to see if their routes through a facility coincided. Similar stops could indicate drop points or pick up points.

It should be understood that the above mentioned figures are for illustration of the principles of the invention only. It would be clear to one skilled in the art that many other combinations and embodiments are within the scope of the present invention.

DETAILED DESCRIPTION

Figure 1:
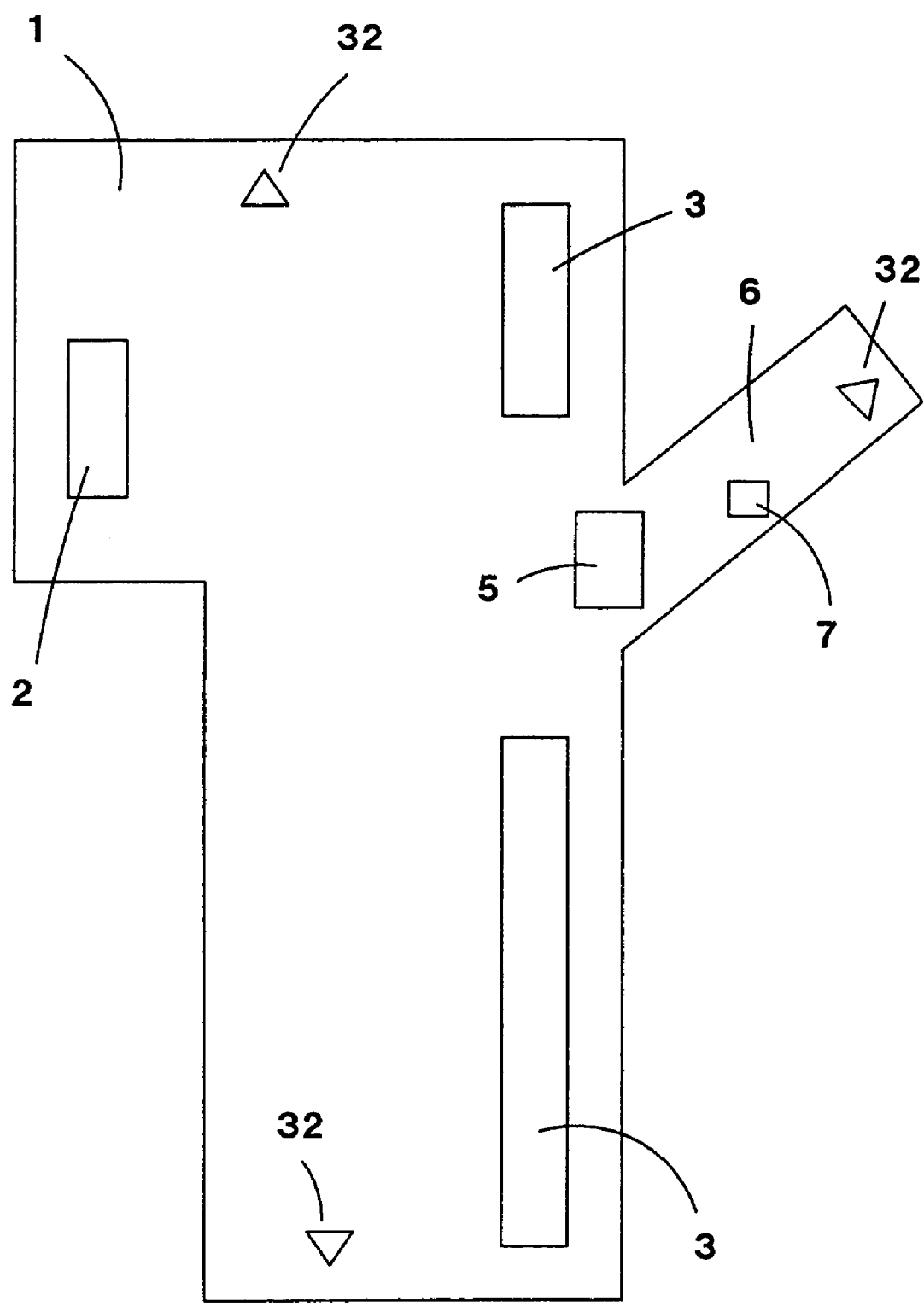
FIG. 1 shows an embodiment of the present invention as a diagram of an airport showing important points in the security scheme.

FIG. 1 shows an airport where the invention is used as a passenger or personnel security system. Most airports contain an entry area or set of doorways (1) where people enter and leave the airport complex. An optional system check-in area (2) can be set up here if it is desired to control people entering and leaving the facility. If this station is used, a person entering the airport simply allows a fingerprint, retinal scan, or any other positive ID to be made at this point. People departing the airport or building would be required to turn in cards at this point in order to egress.

Most airports are constructed with an airline check-in area with long counters where passengers are checked into flights, where most commercial or government buildings have a reception desk in their entrance foyer. FIG. 1 shows several such check-in counters 3 in the case of an airport. At these counters, passengers queue up and wait to present or purchase their tickets. This particular check-in point is where most data is entered into the system of the invention. When a passenger presents a ticket to an agent at this type of checkpoint, the passenger is required to also present some sort of government issued photo identification. Usually this is a driver's license or passport. At this point, a device could scan in the photo on the presented identification. A fraudulent ID would be detected immediately. Any special information about the passenger that was needed or desired by the airline could also be entered such as medical information, special food requirements and other information as may be needed by the airline. Normal seat assignment or check can be made at this point.

Here, the passenger would be required to submit to a positive identification check. Certain travelers may be able to preregister their identities and biometrics and be able to bypass certain security points or could be able to proceed through special lines for travelers with who have been previously cleared. This check can be in the form of a fingerprint scan, an eye retinal or iris scan, a face scan, a hand scan, a palmprint, a hand scan, a finger length scan, DNA check or any other positive identification method. At this point, the system can take a current photo of the passenger, and can present all the data to a computer database. The data can be checked against Police, FBI, INTERPOL, immigration, customs, postal service, or other databases. If law enforcement databases are remote from the airport, the data can be transmitted by modem, LAN, WAN, internet, or any other data transmission method. Portions of the security process may become automated in the future, the present invention accommodates that possibility.

The passenger can then be handed an electronic card device and told to keep it on their person. This card can be a wireless device that can contain data and can be tracked for location throughout the airport complex (or building), and could also be used as an electronic boarding pass. The passenger would of course also be entered into the airline database in the normal way for flight check-in and possibly for aircraft weight and balance purposes. The system can contain antennas 32 for tracking the smartcard. These antennas 32 can be located in many places in the building or airport complex in question.

The passenger would then be allowed to leave the check-in counter with the card as an electronic boarding pass and tracking system. If there has been any discrepancy in the identification given by the passenger after checking the data against law enforcement databases, airport security officials can track the location of the bearer of the card anywhere in the airport. If there is sufficient cause, the passenger could be apprehended or detained at a time and place determined by law enforcement or security officials.

Airports are constructed with a baggage and carry-on security checkpoint 5 which usually contains X-ray equipment for checking carry-on bags and metal detectors (possibly explosive detectors) to check for weapons and dangerous material. With the present invention, this checkpoint 5 could also communicate by wireless means with any card nearby. As the passenger passed through this checkpoint, the system could note this progress. The card could be optionally hand read with a magnetic reader as well as being automatically read. If the passenger were to subsequently leave the secure gate area for any reason, this could be noted.

Once in the gate area 6, the passenger approaches the flight departure gate and passes another checkpoint 7. Here again the system could note the location of the passenger and the fact that he is actually boarding an aircraft. A database check can be made to assure it is the correct aircraft, and if wrong, airline personnel could be immediately notified. At this aircraft boarding checkpoint 7, a second positive identity check can be optionally performed such as taking another fingerprint, retinal or face scan, etc. While this second scan is optional, it tremendously enhances security if used because it can determine if the correct individual is boarding the aircraft.

If a boarded passenger tries to leave an aircraft after successful boarding, the card could immediately detect this fact, and airline personnel, and if necessary security personnel, could be notified. Since there may be legitimate reasons a passenger might deplane (sickness, trying to make a phone call, simply changed mind about traveling, etc.), airline personnel should make sure at this point the reason. The difference between the present invention and the prior art is that with the present invention, the fact that the passenger has left the airplane is immediately known.

The invention could also determine if a person is carrying more than one card, or if a card has been lost. This is very useful in making sure that passengers on planes are the ones who should be there, and that passengers actually take the flight they are supposed to. If someone tries to deplane without a card in their possession an alarm could be set off, or security personnel could be notified. This is easily accomplished since there could be an alarm at the plane entry and exit point 7 that detects anyone trying to pass through. A quick interrogation of the person's card could prevent the actual ringing of an alarm while still alerting airline personnel.

Figure 2:
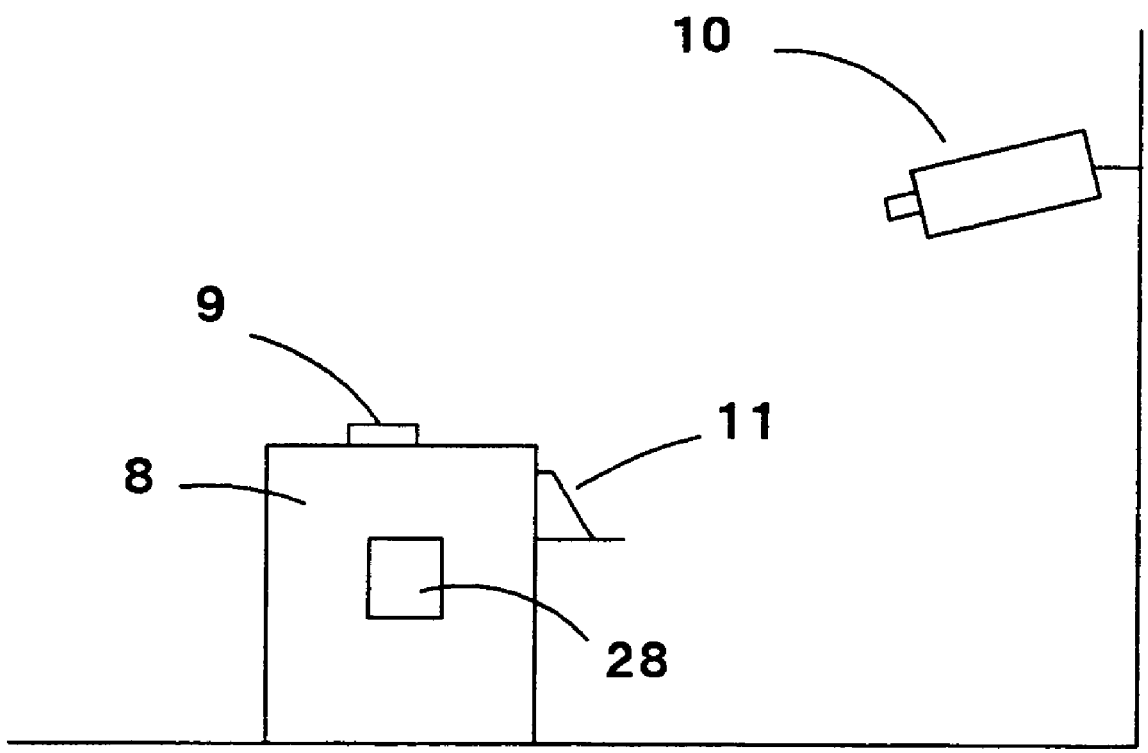
FIG. 2 shows an airport check-in arrangement.

FIG. 2 shows a side view of an airline check-in station using the invention. There can be the counter 8 commonly found at airports with some means for checking in baggage (not shown) and for assigning or checking seating. There can also be a standard computer terminal 11; however this terminal can connect to the card system software of the invention which prompts the operator for specific information required to be entered as well as optional information. In addition, this terminal 11 can allow normal entry of airline passenger check-in data.

The check-in station can contain a positive identification device 9 which can be a fingerprint scanner, an eye retinal or iris scanner, a face pattern or feature scanner, DNA analyzer, hand scanner, palm-print scanner, finger length scanner, or any other means that may exist now or in the future for positive identification of an individual. The station can also be equipped with a camera 10 which can be a digital still photo camera, a TV camera, or any other type of camera or image generation device. The station can also contain a document scanner 28 for scanning in the identification presented by the passenger.

During check in, the passenger could approach the check-in station counter 8 in the normal way. A government generated, photo identification such as a driver's license or passport would be presented by the passenger and scanned using the scanning device 28 provided in the station. A digital photo could be taken with the camera 10, and a positive identification could be made with a positive identification device 9.

After this data is taken, it would be entered into the database of the system. From here it could be transmitted or compared against law enforcement, immigration, or customs information to determine if the individual is wanted, or is a threat in any way, or if there is any other law enforcement interest. After normal airline check-in, the passenger would be presented with a wireless card to carry. This card could be equipped with a transponder so that it could be tracked and located anywhere in the airport or building complex.

Figure 3:
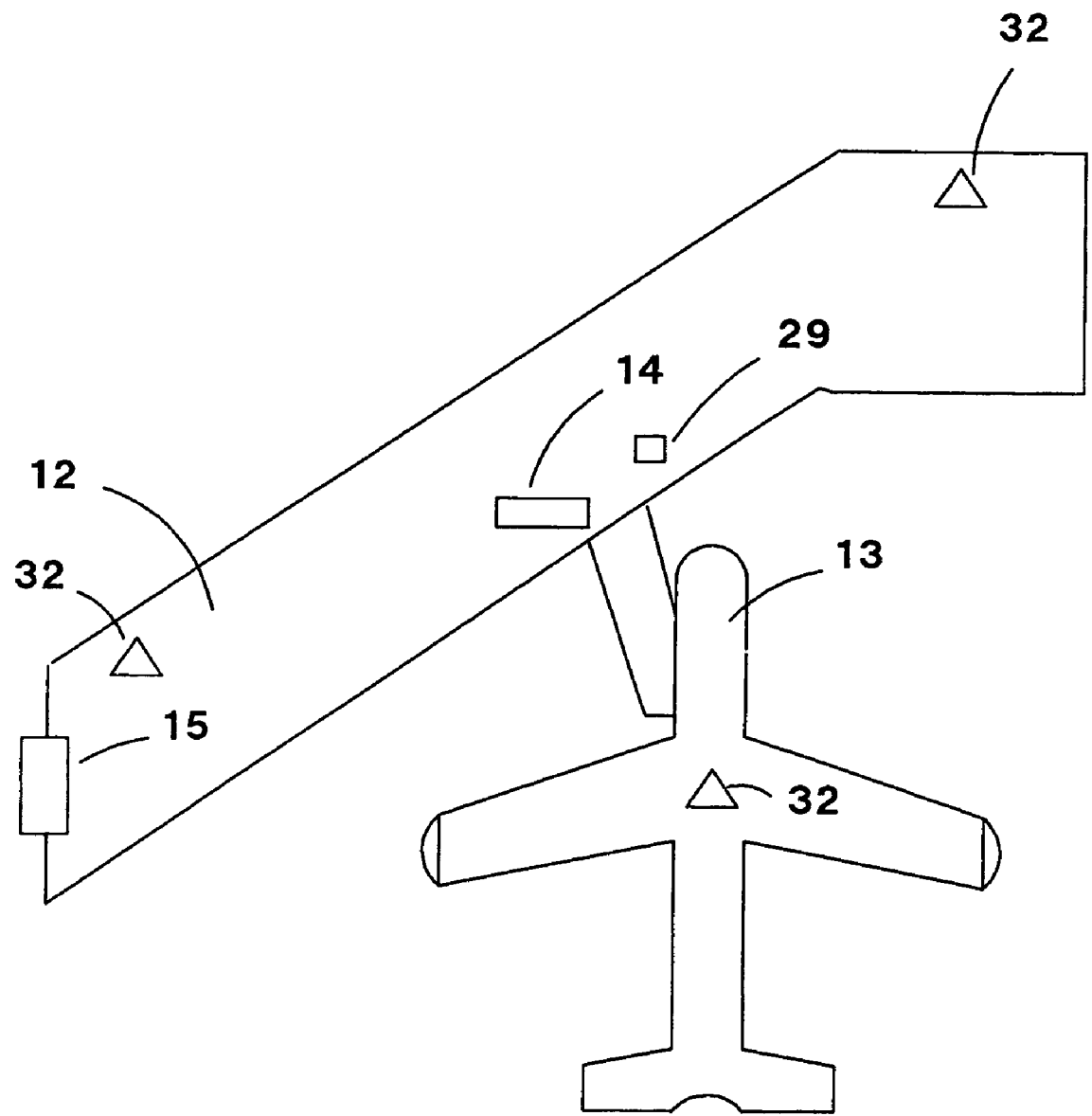
FIG. 3 shows an aircraft boarding gate with egress control.

FIG. 3 shows a typical airport gate area. There is an entrance security port 15 which would usually contain standard carry-on and personal security checks (x-ray and metal detector). In addition however, the system could contain a wireless card interface located at this security gate. As the passenger passed through this security portal into the secure gate area, the portal 15 could send an optional message to the card digitally marking it as to the fact that the passenger is now in the gate area 12 as well as entering the fact in a system database. A similar portal without carry-on check 14 could be located at the aircraft doorway so that when the passenger actually entered the aircraft 13, the card could again be digitally marked indicating the passenger was actually aboard the aircraft. An optional positive identification could be made at this point with an optional second positive identification device 29 to assure that the correct person has boarded.

In addition, the wireless communication can be continued on into the aircraft if the craft is equipped with wireless communications capability. The aircraft's security system could thus also maintain satellite communication with the rest of the system at all times including when the aircraft is in flight.

The present invention allows tracking of the passenger from the non-secure part of the airport into the secure gate area, and finally onto the aircraft by various antennas 32 or other communications means located throughout the facility or airport. Upon arrival at a different airport, the present invention allows tracking of the passenger from the aircraft 13 into the secure gate area 12, on to customs/immigration, if an international flight, and out of that area to a baggage area or to another transfer aircraft, and either out of the airport or onto a second aircraft.

Figure 4B:
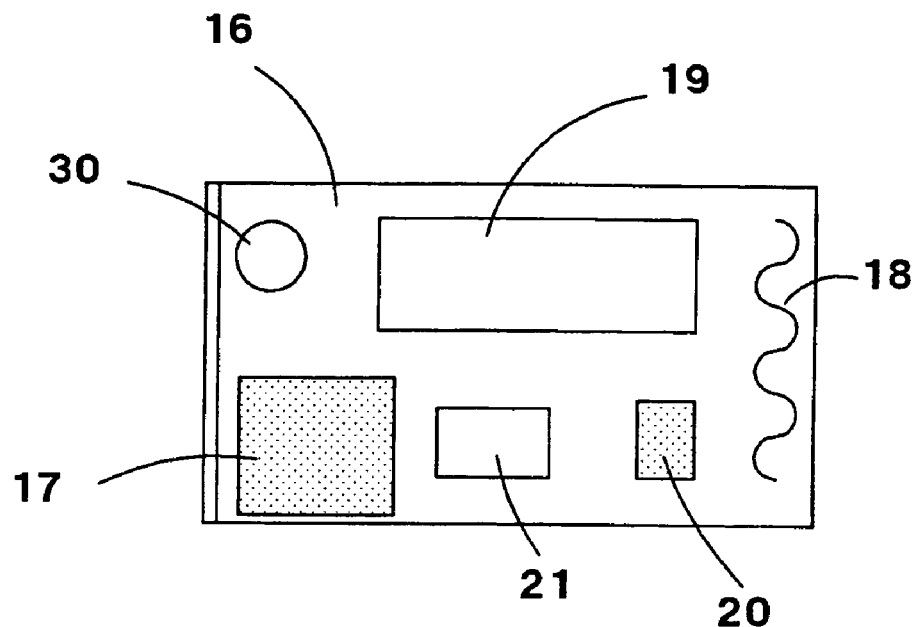
FIG. 4 shows a representative drawing of a possible card or carry device along with LED display and audible alarm.
Figure 4A:
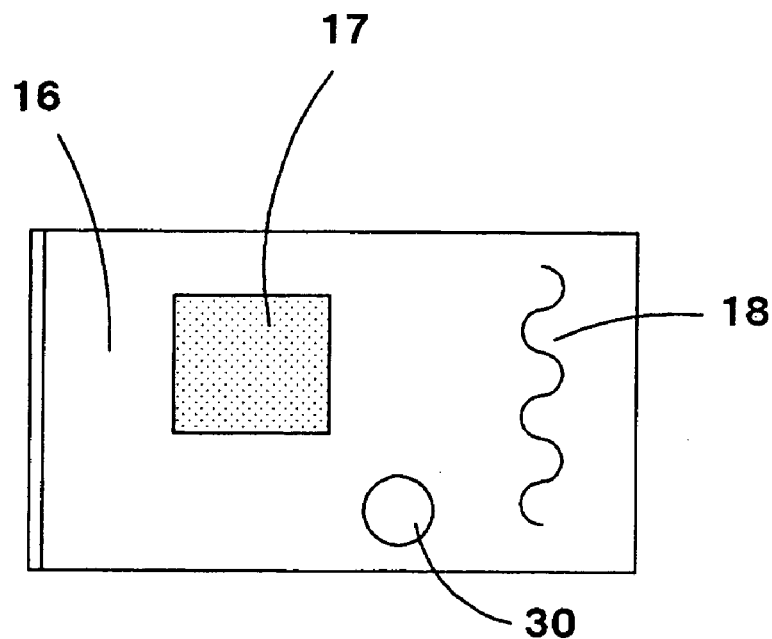

FIGS. 4A and 4B show replicas of a "smart" type card 16. The embodiment in FIG. 4A is a simple card used for identification only. This embodiment could contain a processor and wireless transponder 17 embedded in the card. An antenna 18 can also be embedded in the card as well as a battery 30. The processor can also contain optionally RAM or ROM memory. Various programs or processes can be used with the card 16. The processor can be a microprocessor or microcontroller or any other processor device. Memory can be internal or external to the processor.

FIG. 4B shows a more sophisticated version of an electronic card 16. Here, in addition to the features described in relation to the card shown in FIG. 4A, the card could contain a display 19, a microphone/speaker 20, a miniature mouse 21 and other features needed to transmit, receive, and/or display information such as email, flight schedules, internet, and messages of concern from the airline such as gate changes, etc., as well as stock prices, news headlines or stories, or any other type of information that might be of interest to the passenger. In addition, the advanced card of FIG. 4B could also be used to play various games using the mouse device 21. A different version could also contain a cellular telephone (not shown). The card device could also be a Personal Digital Assistant (PDA). In this case the device should, in addition, have the sophistication of various PDA units on the market. The card unit could also optionally contain a cellular telephone. Of course any electronic card unit could contain memory. At least 16 MB would be desirable; however, any amount of memory, memory contained in a keychain drive, or no memory, is within the scope of the present invention.

Tracking of the card 16 within the airport can always be accomplished using a series of local antennas within the building. Normal burst transponding techniques are among the many types of location and communication that can be used. Any type of wireless method of handling multiple stations can be used including spread-spectrum, wi-fi, bluetooth wireless, cellular telephone, or any other digital or analog wireless methods. Transmission between airport antennas and the card 16 can be radio frequency or optical, including infrared, continuous, packet, burst, or any other means using time-division multiplex, frequency division multiplex, code division multiplex, other spread spectrum, Wi-Fi, ultra-wideband or any other wireless communication method. Modulation can AM, FM, PM, using any type of PCM or data communications technique or combination of these methods including QAM and QPSK, or any other modulation technique. In addition, optional error correcting codes and retransmission techniques can be used to assure data integrity. Any remote means of communicating with the card is within the scope of the present invention. It is also possible for the electronic card to communicate with satellites or other exterior stations if necessary.

Figure 5:
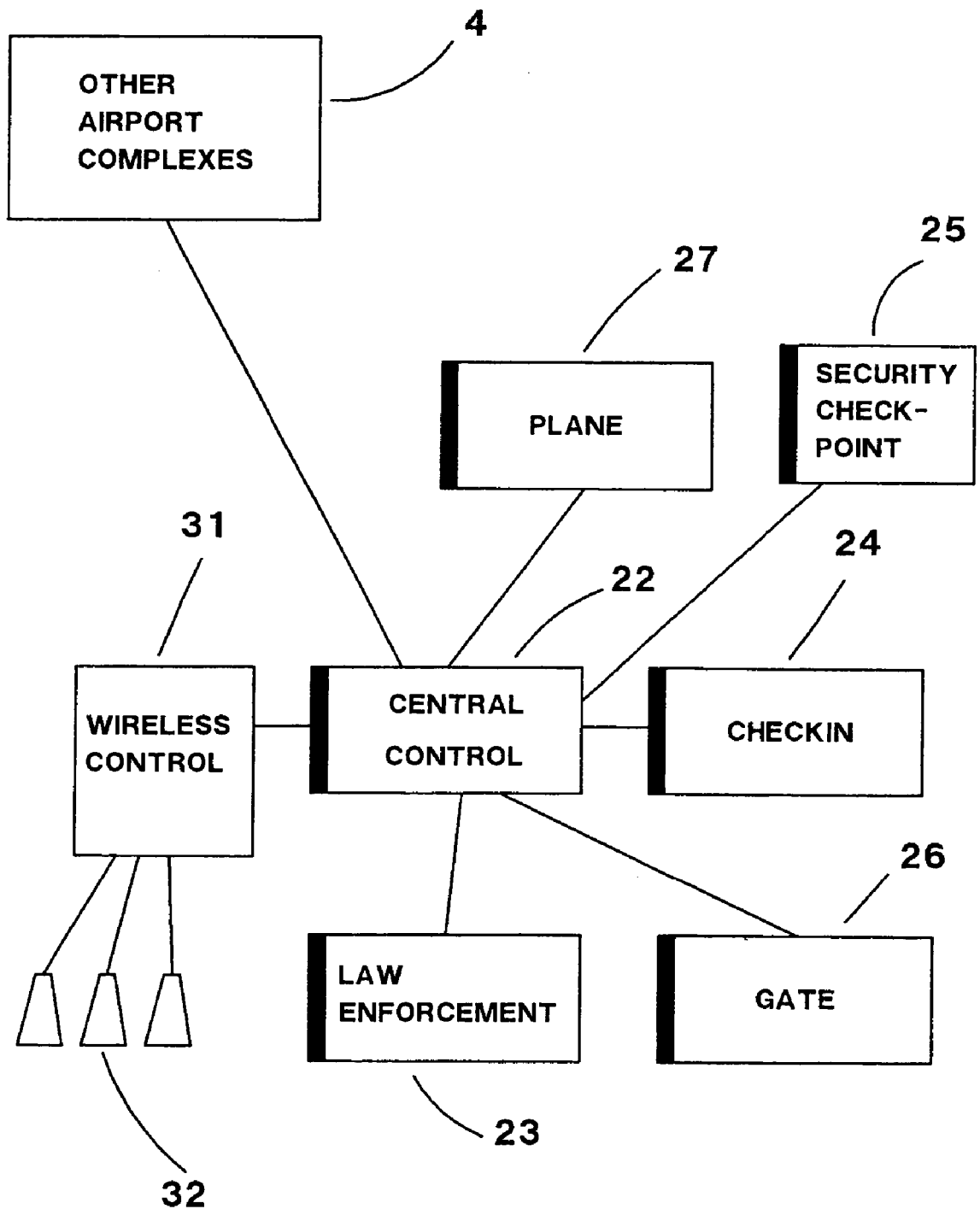
FIG. 5 shows a block diagram of the relationships between the card, check-in, and security/law enforcement data bases.

FIG. 5 shows possible logical relationships between various possible components of the invention. A central control and database 22 can be a mainframe, personal computer, or any other type of computer system. This central control can be connected by modem, LAN, WAN, internet, radio or any other communications means to law enforcement, immigration/customs and/or DMV data bases 23 for identification verification and determining if a given individual is of any interest to law enforcement officials. The central control 22 can also be connected by cable, LAN, WAN, modem, wireless, or by any other connection means to check-in points 24 where airline personnel check-in passengers, security check points 25, boarding gates 26, and other points in the airport including parked aircraft 27. In addition to the links shown, the central control point 22 for a given airport can be connected to control points for other airports 4 or to a master control point for a country or even the entire world. Communications can continue into the interior of aircraft, even aircraft in flight with satellite communications. The central control point 22 can be connected to a wireless communication system controller 3 within an airport or building. This wireless controller 31 can be connected to a number of antennas 32 located throughout the airport or building.

Position location can be accomplished by using signal strength to determine the nearest antenna to the card in question, direction fixing by multiple antennas, GPS or assisted GPS techniques where a GPS receiver is incorporated into the card or any other location technique relative or absolute. Resolution to at least a major location area within an airport or building is very important. In a building, it is desirable to know what floor a visitor or employee is on and approximately where on that floor. The higher the position resolution, the better; however, the system can run with minimum position resolution as long as position is known well enough for security personnel to find a person in an airport or building within a reasonable time or to determine that the person is not where he or she should be (for example has somehow illegally entered a ramp area or equipment room).

In the case where multiple airports or buildings are linked into a single system, passengers with cards can be tracked from airport to airport around the world from the time a passenger first enters an airport to the time the passenger leaves the airport system at a final destination, including tracking of passengers aboard aircraft in flight using satellite communication techniques. In addition, the system of the present invention can track airport or building employees, both full time and part time or temporary, and baggage if a card is also attached to baggage.

An embodiment of the present invention can contain a display device that could be located in a control room and manned by security or airline personnel. It could also be located in a security control room of a commercial building. The display device can be a standard computer monitor or special display device. A screen displays an outline of the airport or building. If there are multiple floors, individual floor plans can be brought up and changed for viewing. The display shows secure gate areas with aircraft parked at some gates. The floor plan shows gates, passageways, and bathrooms as well as all other rooms or spaces. Security check points can be noted as well as building entrances and exits. Passengers or visitors of interest can be displayed and tracked. The icon for a particular person being tracked could carry an identification box with relevant information about that person. In addition, different colors could be used to indicate the degree of interest. Special marks could signal whether that person was in a secure area or not. In short, the display can display any data of interest about a particular person in the building, including who they are and especially where they are.

The present invention could also be used to track baggage. An electronic card device could be attached to baggage, and the baggage could thus be tracked through the system just like a passenger. This type of baggage tracking would assure that a passenger's baggage was on the same plane as the passenger.

The present invention is very useful for companies or systems (such as the national airways or airports) to track employees. Employees with access badges have presented a particularly dangerous situation recently at several major airports. Such employees, while off duty or on vacation, have been caught using their access badges to bypass standard screening and to even take unchecked (un-x-rayed) packages into the system and on to airliners. The present invention would provide a smart badge that is tracked for whereabouts and would trigger an alarm if the employee tried to bypass a security screening checkpoint or attempted to access an area to which he had no clearance. In addition, it would show the presence and location of every employee in the building or airport at all times. Such a badge could be worn anywhere on the body including the wrist like a wristwatch. Employees entering the facility for the first time any day could be positively identified using one of the methods described herein in order to pick up their smartcard/badge. Any illegal movement within the facility could be tracked and noted. Access to any door whatsoever would require the use of the smart card/badge of the present invention. There would be no other access methods allowed. Doors or security checkpoints or checkpoint bypass routes could be specially designated.

The illustrations and descriptions herein were presented for understanding of the present invention. It would be clear to one skilled in the art that many other embodiments and variations are possible which are within the scope of the present invention.

I claim:

1. A method of building personnel security management comprising the steps of:
   acquiring physical identification data for a person entering a facility;
   performing an identity verification by checking said identification data acquired against stored identification data in at least one database;
   issuing to each person entering said facility a wireless identification unit;
   establishing a location of said wireless unit.

2. The method of claim 1 wherein said facility is a transportation facility.

3. The method of claim 1 wherein said facility is an office building.

4. The method of claim 1 wherein said wireless identification unit communicates via a wireless network.

5. The method of claim 1 wherein said wireless identification unit contains a transponder.

6. The method of claim 1 further comprising the step of comparing said person against said database a second time when said person exits said facility.

7. The method of claim 1 wherein acquiring said positive identification data is by taking a fingerprint.

8. The method of claim 1 wherein acquiring said positive identification data is by face feature scan.

9. The method of claim 1 wherein acquiring said positive identification is by retinal scan.

10. The method of claim 1 further comprising the step of requiring said person to show a government generated ID card.

11. The method of claim 1 wherein said wireless identification unit is a smartcard.

12. The method of claim 1 wherein said wireless identification unit is worn on the wrist.

13. A method for tracking persons in a complex comprising:
   positively identifying a person when said person enters said complex;
   issuing said person a wireless identification device after said positive identification;
   monitoring said person's location in said complex using said identification device.

14. The method of claim 13 wherein said identification device notifies a central location each time said person passes or bypasses any security checkpoint.

15. The method of claim 13 wherein said identification device notifies a central location if said person passes through a designated door.

16. A method for security comprising the steps of:
   measuring at least one positive identification parameter of a person to determine identification data for that person;
   entering said identification data into a security controller;
   comparing said identification data against at least one database;
   issuing a wireless device to said person, said wireless device containing identification information for said person, said wireless device capable of communicating with said security controller.

17. The method of claim 16 wherein said identification information contained in said wireless device includes said positive identification parameter.

18. The method of claim 16 wherein said positive identification parameter is a fingerprint.

19. The method of claim 16 wherein said positive identification parameter is a retinal scan.

20. The method of claim 16 wherein said positive identification parameter is a facial feature.

* * * * *